July 11, 1944.  W. E. PILAND  2,353,264
HAND TRUCK
Filed Nov. 28, 1942
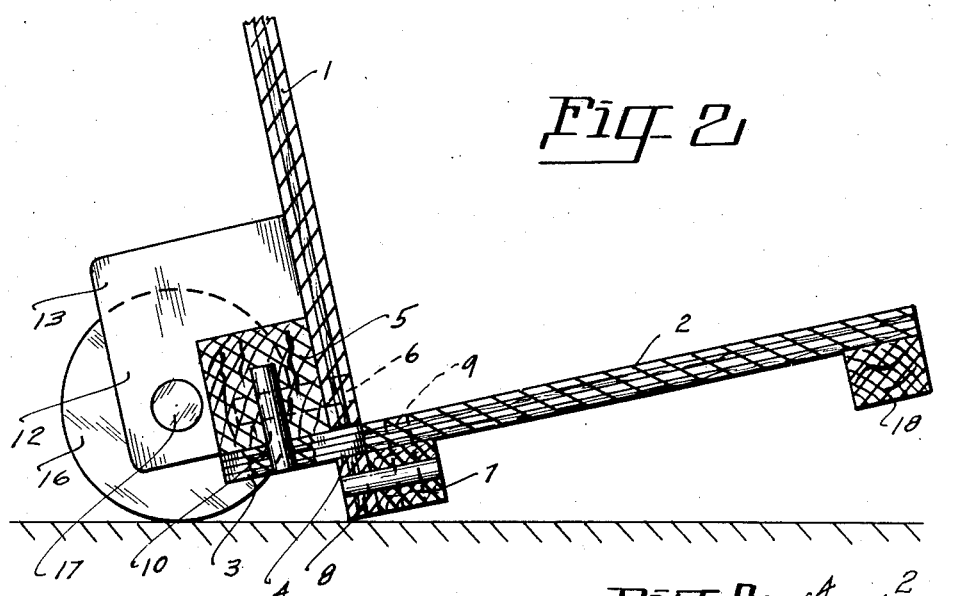
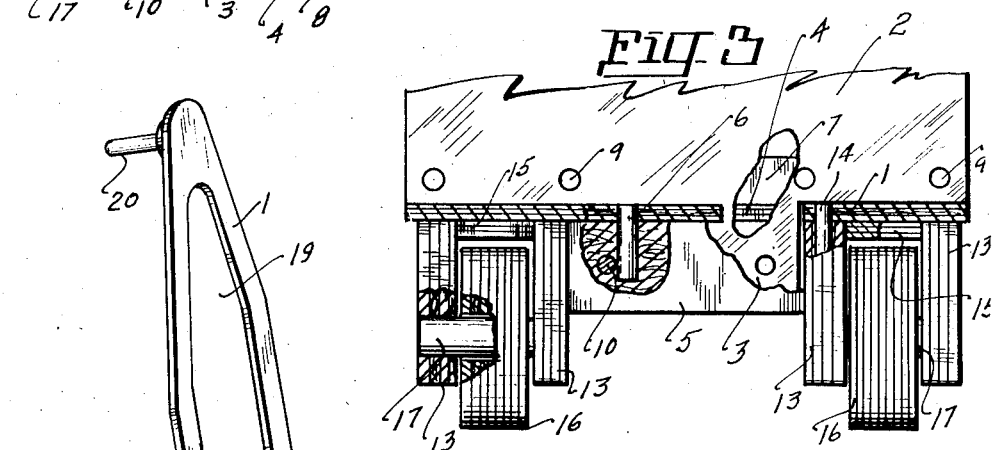
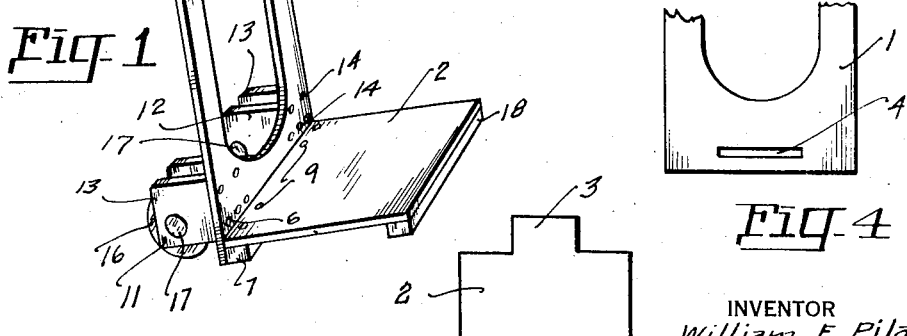
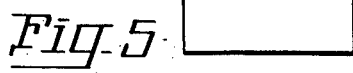
INVENTOR
William E. Piland
BY
ATTORNEY Patented July 11, 1944

2,353,264

UNITED STATES PATENT OFFICE 2,353,264

HAND TRUCK

William E. Piland, Portland, Oreg.

Application November 28, 1942, Serial No. 467,211

4 Claims. (Cl. 280—53)

This invention relates to hand trucks that are particularly adapted to be manufactured from wood and the like.

The primary object of the invention is to assemble a hand truck by the use of re-enforcing members, located in such manner as to give rigidity and strength to the truck when manufactured from wood or the like.

A truck manufactured from plywood is light of construction, portable and economical to manufacture, and it is particularly adapted to present conditions where metals are needed elsewhere.

These and other incidental objects will be apparent in the specification, drawing and claims.

Referring to the drawing:

Figure 1 is a perspective drawing of my new and improved hand truck.

Figure 2 is a fragmentary enlarged sectional illustration of the hand truck, especially illustrating the assembly of the various parts, and the principle of securing them together.

Figure 3 is a plan view of the truck shown in Figure 2, parts being in section and the lip broken away for convenience in illustration.

Figure 4 is a fragmentary detail of the lower end of the truck body or frame.

Figure 5 is a plan view of the lip of the truck removed therefrom.

In the drawing:

My new and improved hand truck consists of a body or frame 1, having a lip 2 extending at approximately right angles therefrom. The frame 1 and lip 2 are assembled together in the following manner.

The lip 2 has an extending tongue 3 for registering with the cross slot 4 located in the lower end of the frame 1. The tongue 3 of the lip 2 extends through this slot 4 and is held therein by the brace members 5 and 7, and dowel pins 10. The brace member 5 is secured to the frame 1 by suitable fastening means, as dowel pins 6 and other means as glue. The main object of this improvement is to provide a solid rigid brace between the frame 1 and the lip 2, the slot 4 working in conjunction with the extending tongue 3, maintaining a fixed angle between the frame 1 and the lip 2, resisting whatever stress that may be applied between these two members.

A second brace member 7 is dowel pinned to the lower end of the frame at 8 and glued or otherwise fastened. Dowel pins 9 also pass through this member and the lip 2, securing the whole assembly rigidly together.

The outer end of the tongue 3 is securely doweled to the brace member 5 by the pins 10. From the above description it can be readily understood that when the frame 1 and lip 2 are secured to the brace members 5 and 7, with dowel pins and other fastening means, that this construction provides a very rigid assembly, and when manufactured from wood, the grain of the wood should run in a direction to receive and withstand stresses applied between the frame and the lip by the load carried by the truck. I do not wish to be limited to the manufacturing of this truck from wood, as other suitable material may be employed still coming within the scope of the invention.

Two wheel mountings 11 and 12 are secured to the frame 1, each mounting including outwardly extending members 13 secured to the frame 1 by dowel pins 14 and other fastening means. The members may be braced further by the cross pieces 15. The trunnion wheels 16 are journaled to cross shafts 17, which are mounted in the extending members 13. The complete assembly may be manufactured from wood.

I have shown the entire truck in this case manufactured from plywood. The shafts 17 and wheels 16 are located near the lower outer corner of the supporting members, providing the proper pivot location for the operation of the truck and for greater strength of the trunnion wheel assembly. A brace member 18 may be secured to the outer end of the lip 2 for maintaining the lip in a level position while loading the truck. The lower end of the frame 1 and brace member 7 are located at a position relative to the wheel 16 so as to provide a pivot that the truck may be operated about, insuring the easiest possible operation of the same.

The opening 19 within the frame 1 provides a space for holding barrels and the like and preventing them from rolling off the truck. A suitable operating handle 20 is also provided at the upper end of the frame 1 for moving the truck about.

Reviewing the outstanding features of my invention, the principal object is the assembling together of the different and various parts of the truck by brace members in combination with dowel pins.

I do not wish to be limited to the mechanical construction herein illustrated, as other forms of mechanical embodiment may be employed, still coming within the scope of the claims to follow.

What I claim is:

1. A hand truck, comprising a frame formed with a slot near one end, a lip formed with a tongue at one end to engage in the slot in the frame, roller mountings carried by the frame adjacent each side edge, rollers in the mountings, a brace between the respective mountings and engaging the frame and the tongue, a second brace engaging the frame below the slot and the lip adjacent the tongue, means for securing the first mentioned brace to the tongue and the frame, and means for securing the second mentioned brace to the lip and the frame.

2. A truck including a frame formed with a slot adjacent its lower end, a lip extending at substantially a right angle to the frame, the lip being formed at the end adjacent the frame with a tongue to more or less snugly fit said slot and extend beyond the frame, roller carrying mountings secured to that surface of the frame in advance of the lip, and a bracing block bearing on the tongue and against the frame, said block fitted between and bracing the roller mountings, and means for securing said block to the tongue and to the frame.

3. A construction as defined in claim 2, wherein a second bracing block is provided to bear beneath and against the lower surface of the lip and the adjacent surface of the frame, and wherein means are provided to secure said second block to the lip and to the frame.

4. A construction as defined in claim 2, wherein additional bracing blocks are arranged transverse the lower surface of the lip, one of said additional blocks being secured in contact with the lip and with the adjacent surface of the frame, the other of said additional blocks being secured to the lip at the end remote from the frame, the additional bracing blocks serving as supports for the truck independently of the rollers.

WILLIAM E. PILAND.